(12) United States Patent
Kakizoe (10) Patent No.: US 6,497,506 B1
(45) Date of Patent: Dec. 24, 2002

(54) HEAD LAMP APPARATUS FOR VEHICLE (75) Inventor: Takashige Kakizoe, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/427,084

(22) Filed: Oct. 26, 1999

(30) Foreign Application Priority Data

Oct. 26, 1998 (JP) .......................... 10-304347

(51) Int. Cl.$^7$ .............................. F21V 5/00; F21V 7/00
(52) U.S. Cl. ................... 362/544; 362/475; 362/476; 362/464; 313/113; 313/115; 313/118.05
(58) Field of Search ................................ 313/113, 115, 313/318.05; 362/61, 66, 476, 80, 544, 464, 543, 539, 475

(56) References Cited

U.S. PATENT DOCUMENTS

| 5,353,204 A | * | 10/1994 | Kawamura | ............... 362/61 |
| 5,390,087 A | | 2/1995 | Daumueller et al. | ........... 362/61 |
| 5,546,284 A | * | 8/1996 | Harada | ................. 362/61 |
| 5,945,776 A | * | 8/1999 | Koster et al | ................ 313/113 |
| 6,059,436 A | * | 5/2000 | Hashigaya | ................. 362/544 |
| 6,260,993 B1 | * | 7/2001 | Ito | ........................ 362/514 |

FOREIGN PATENT DOCUMENTS

| EP | 0 277 349 | 8/1988 |
| GB | 2 207 230 | 1/1989 |
| JP | 4-43501 | 2/1992 |
| JP | 08329703 | * 12/1996 ......... F21M/003/05 |

OTHER PUBLICATIONS

Derwent Publications, AN 1997–321474, DE 196 52 569, Jun. 19, 1997 (previously filed on Feb. 22, 2000).
Derwent Publications, AN 1998–006132, JP 9–274802, Oct. 21, 1997 (previously filed on Feb. 22, 2000).
Derwent Publications, AN 1998–491404, Aug. 11, 1998 (previously filed on Feb. 22, 2000).

* cited by examiner

Primary Examiner—Nimeshkumard D. Patel
Assistant Examiner—Sikha Roy
(74) Attorney, Agent, or Firm—Oblon, Spivak, McClelland, Maier & Neustadt, P.C.

(57) ABSTRACT

A head lamp apparatus for a vehicle comprises a lamp housing mounted to a front portion of a vehicle body, a head lamp bulb disposed inside the lamp housing and adapted to radiate a light, a reflector for reflecting an irradiation light from the head lamp bulb in a direction forward of the vehicle body, and a position bulb disposed in front of the head lamp bulb inside the lamp housing.

7 Claims, 9 Drawing Sheets

HEAD LAMP APPARATUS FOR VEHICLE

BACKGROUND OF THE INVENTION

The present invention relates to a head lamp apparatus for a vehicle having a position bulb in addition to a head lamp bulb for illuminating an area ahead of the vehicle.

Figure 10:
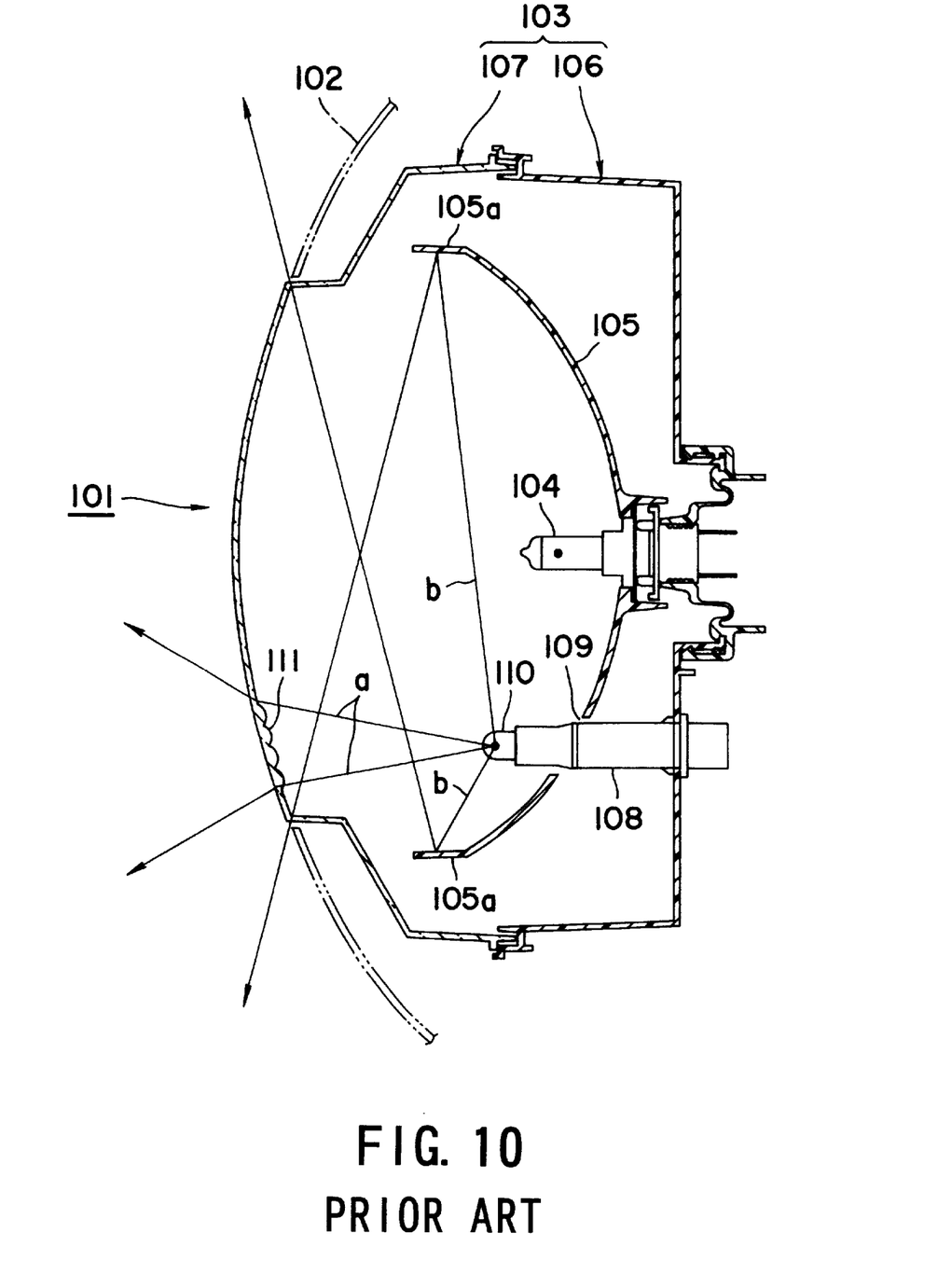
FIG. 10 is a transverse sectional view of a head lamp apparatus according to the prior art.

FIG. 10 is a cross-sectional view of a head lamp apparatus for a motorcycle. The head lamp apparatus 101 is of the type disposed at a front head portion of a streamlined cowling 102 of the motorcycle and a head lamp bulb 104 and a reflector 105 are disposed inside a lamp housing 103. The lamp housing 103 is formed by covering a front surface of a housing body 106 molded by using synthetic resin with a transparent housing lens 107.

A bulb socket 108 disposed on a rear surface of the housing body 106 extends forward through a socket hole 109 defined in the reflector 105 and is defined at its tip end with a position bulb 110. The housing lens. 107 is not effected with a lens cutting operation and passes light as it is, but a lens cut portion 111 is formed only at a portion of the housing lens 107 in front of the position bulb 110.

In the head lamp apparatus 101, a forward irradiation light a from the position bulb 110 is amplified and diffused by the lens cut portion 111 and is radiated forward. An irradiation light b from the position bulb 110 radiated diagonally forward or sideways is reflected by a flange portion 105a formed at an edge portion of the reflector 105 and is radiated diagonally forward. As a result, the light from the position bulb 110 is then radiated forward with a wide angle.

Figure 11:
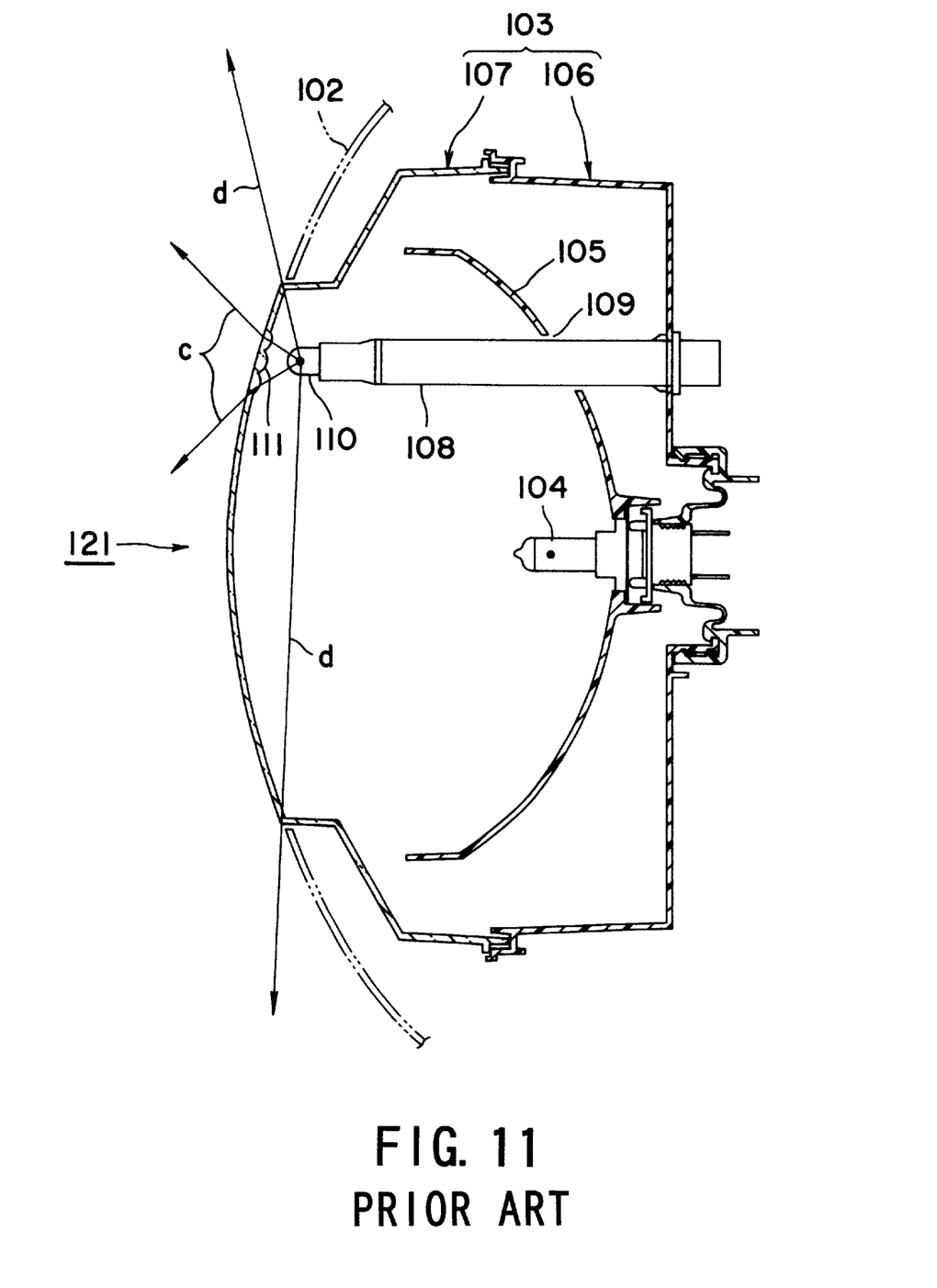
FIG. 11 is a transverse sectional view of a head lamp apparatus according to the prior art.

In a head lamp apparatus 121 shown in FIG. 11, on the other hand, a bulb socket 108 is extended such that a position bulb 110 is close to a housing lens 107 and a lens cut portion 111 is formed only at a portion of the housing lens 107 in front of the position bulb 110. In a case of the head lamp apparatus 121, a forward irradiation light c from the position bulb 110 is amplified and diffused by the lens cut portion 111 and is radiated forward. An irradiation light d radiated diagonally forward or sideways is radiated forward with a wide angle without being reflected by the reflector 105 because the position bulb 110 is disposed close to the housing lens 107.

Visibility of the irradiation light from the position bulb 110 of the head lamp apparatus 101 shown in FIG. 10 is not good because the radiating light b reflected by the flange portion 105a of the reflector 105 is radiated diagonally forward and sideways and quantity of light of the irradiation light b is less than that of the radiating light a while the irradiation light a amplified by the lens cut portion 111 is radiated forward and quantity of light of the radiating light a is satisfactory. Moreover, visibility of the irradiation light from of the position bulb 110 is strongly influenced by a shape of the reflector 105 (flange portion 105a).

In this respect, in the head lamp apparatus 121 shown in FIG. 11, because the irradiation light d from the position bulb 110 radiated diagonally forward and sideways is radiated directly with the wide angle without being reflected by the reflector 105, satisfactory quantity of light can be obtained and an visibility of the radiating light from a diagonally front direction and from a side is favorable. However, because the bulb socket 108 projects from a reflecting surface of the reflector 105 by a very large length, the bulb socket 108 is conspicuous from outside through the housing lens 107 which passes light as it is, which becomes a cause of impairment of an outer appearance of the head lamp apparatus 121.

Moreover, because the bulb socket 108 is long, vibration of the body is greatly amplified to be transmitted to the position bulb 110 provided to the tip end of the bulb socket 108, which may cause early breaking of a wire of the position bulb 110. Furthermore, it is necessary to draw the bulb socket 108 rearward out of the lamp housing 103 to change the position bulb 110, but drawing out of the long bulb socket 108 requires a large space behind the lamp housing 103, which adversely affects a layout of other parts.

Furthermore, in any of the head lamp apparatus 101 and 121, the lens cut portion 111 for the position bulb, which is formed on the housing lens 107 which passes light as it is, is positioned at a position largely displaced from a center of the head lamp apparatus 101 or 121, which becomes a cause of impairment of an outer appearance of the head lamp apparatuses 101 and 121.

On the other hand, as another problem, an aiming plate or the like for adjusting an optical axis of a projector lamp can be seen from outside through the housing lens 107 if the projector lamp is disposed inside the head lamp apparatus 101 or 121 having the housing lens 107 which passes light as it is, thus significantly impairing the outer appearance.

SUMMARY OF THE INVENTION

It is a primary object of the present invention is to substantially eliminate defects or drawbacks encountered in the prior art mentioned above and to provide a head lamp apparatus for a vehicle capable of ensuring satisfactory quantity of light of a position bulb, improving a visibility of the head lamp apparatus by allowing an irradiation light from the position bulb to be radiated with a wide angle, and arranging the position bulb at a portion not close to one side to improve an outer appearance of the head lamp apparatus.

It is another object of the present invention to provide a head lamp apparatus for the vehicle capable of facilitating change of the position valve and preventing early breaking of a wire of the position bulb.

It is a further object of the present invention to provide a head lamp apparatus capable of efficiently diffusing the irradiation light from the position bulb and improving an anti-glare (glare-shielding) property of the head lamp apparatus when the head lamp bulb illuminates.

It is a still further object of the present invention to provide a head lamp apparatus for the vehicle capable of improving an outer appearance of the head lamp apparatus by hiding an aiming plate or the like of a projector lamp provided additionally in a lamp housing.

It is a still further object of the present invention to provide a head lamp apparatus for the vehicle for improving an anti-glare property of the head lamp apparatus by cutting a diffused light beam or the like radiated from the projector lamp provided additionally in the lamp housing.

These and other objects can be achieved according to the present invention by providing, in one aspect, a head lamp apparatus for a vehicle comprising:

a lamp housing mounted to a front portion of a vehicle body;

a head lamp bulb disposed inside the lamp housing and adapted to radiate a light;

a reflector for reflecting an irradiation light from the head lamp bulb in a direction forward of the vehicle body; and a position bulb disposed in front of the head lamp bulb inside the lamp housing.

In a preferred embodiment of this aspect, the lamp housing is provided with a housing body and a transparent housing lens covering a front surface of the housing body and the head lamp bulb, the reflector and the position bulb are housed in the lamp housing, and the position bulb is disposed on an upper front side in the lamp housing.

The housing lens is provided with a lens cut portion at a position in front of the position bulb.

In another aspect, there is provided a head lamp apparatus for a vehicle comprising:

a lamp housing mounted to a front portion of a vehicle body;

a head lamp bulb disposed inside the lamp housing and adapted to radiate a light;

a reflector for reflecting an irradiation light from the head lamp bulb in a direction forward of the vehicle body; and a projector lamp mounted to the lamp housing in adjacent to the reflector and having a projector lamp body and a projector lamp lens mounted to a front portion of the projector lamp body in the forward direction of the vehicle body, the reflector being formed with an extension extending towards the projector lamp, the extension having a size covering the projector lamp except for the projector lamp lens.

In a preferred embodiment of this aspect, the extension has a tip end portion which is positioned further forward than a joint portion of the projector leans and the lamp body. The extension has a cutout for preventing the covering of the projector lamp lens.

An aiming plate is mounted to the housing body around the projector lamp body so as to adjust an axis of irradiation light.

According to the present invention of the structures mentioned above, because the position bulb is disposed in front of the head lamp bulb, the irradiation light from the head lamp bulb is not cut off, satisfactory quantity of light of the position bulb can be ensured, and the irradiation light from the position bulb can be caused to be radiated at a wide angle, thereby improving visibility. Furthermore, because the position bulb is positioned not close to one side, the outer appearance of the head lamp apparatus can be improved.

Furthermore, since the head lamp bulb, the reflector, and the position bulb are housed in the lamp housing having the housing body and the transparent housing lens covering the front surface of the housing body and the position bulb is disposed on the upper front side in the lamp housing, the change of the position bulb is facilitated and the early breaking of the wire of the position bulb can be prevented.

Still furthermore, since the lens cut portion is formed at the portion of the housing lens in front of the position bulb, the irradiation light from the position bulb can be efficiently diffused and the anti-glare property of the head lamp apparatus when the head lamp bulb illuminates can be improved.

Still furthermore, since the head lamp apparatus comprises the head lamp bulb, the reflector for reflecting the irradiation light from the head lamp bulb ahead of the vehicle, and the projector lamp disposed in adjacent to the reflector, and the reflector has the extension portion which extends towards the projector lamp and hides the projector lamp excluding the projector lens when the head lamp apparatus is viewed from a front side thereof, the aiming plate or the like provided to the projector lamp can be hidden by the extension portion to improve the outer appearance of the head lamp apparatus.

Still furthermore, since the tip end position of the extension portion is disposed further forward than the joint portion of the projector lens and the lamp body of the projector lamp when the head lamp apparatus is viewed from the side thereof, it is possible to cut off the diffused light beam or the like radiated by the projector lamp to improve the anti-glare property of the head lamp apparatus.

The nature and further characteristic features of the present invention will be made more clear from the following description made with reference to the accompanying drawings.

DESCRIPTION OF THE PREFERRED EMBODIMENTS

An embodiment of the present invention will be described hereunder with reference to the drawings.

Figure 1:
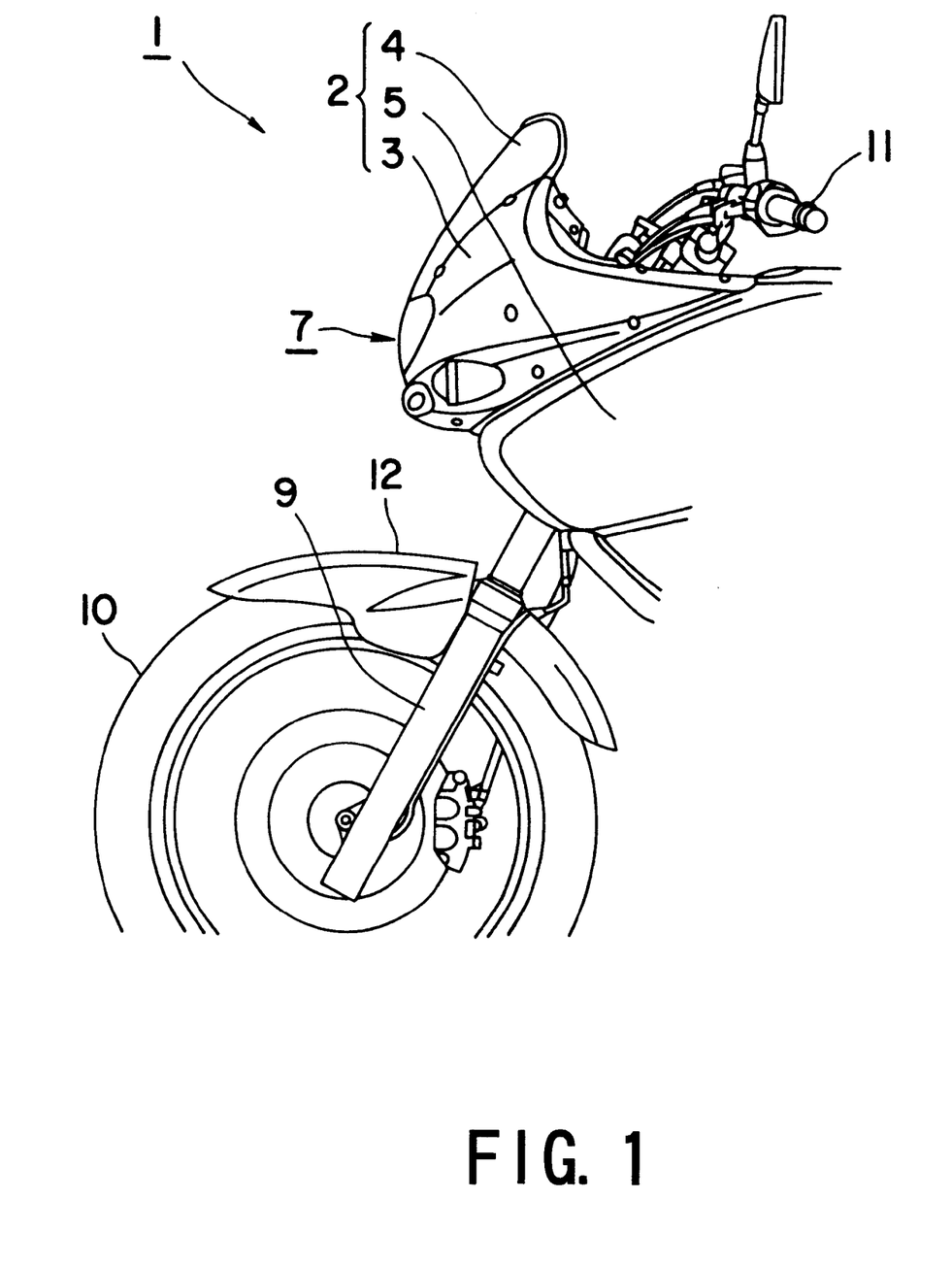
FIG. 1 is a left side view of a front head portion of a motorcycle to which a head lamp apparatus for a vehicle according to the present invention is applied.
Figure 2:
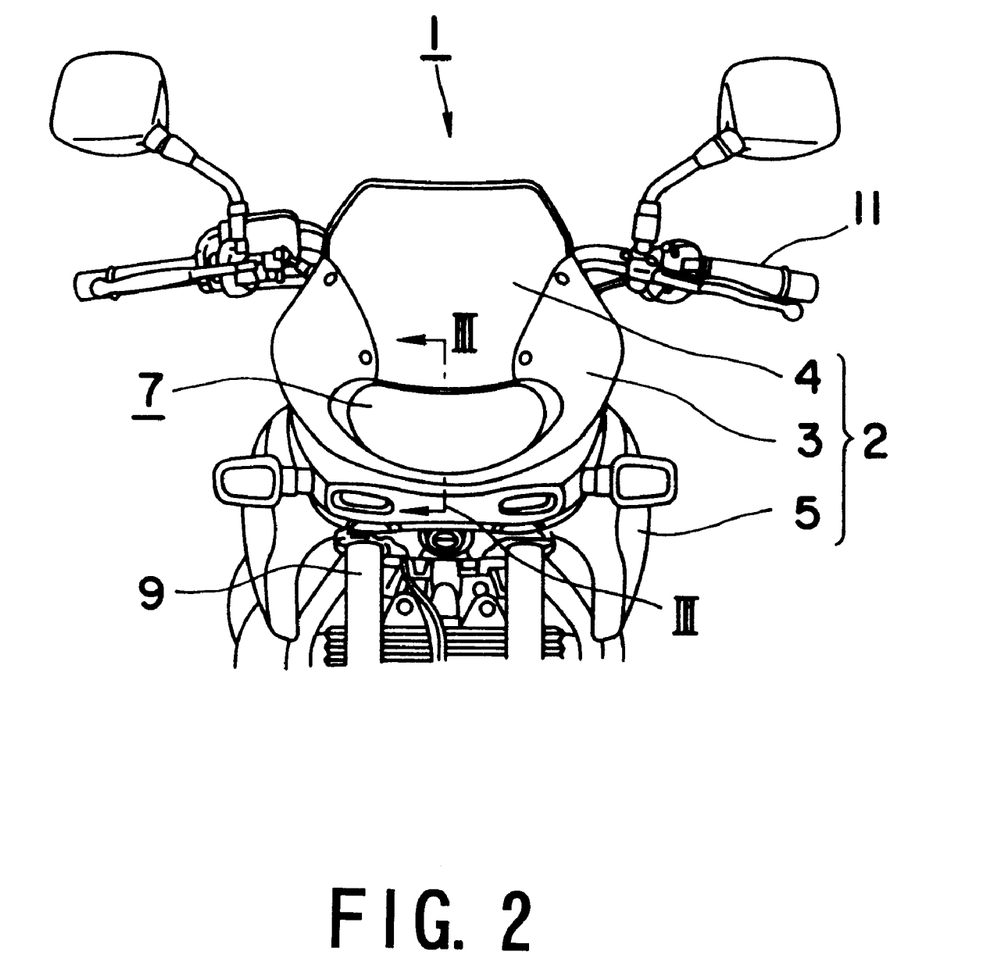
FIG. 2 is a front view of a front head portion of the motorcycle.

First, with reference to FIGS. 1 and 2, a front head portion of a body of the motorcycle 1 is covered with a streamlined front cowling 2. The front cowling 2 comprises an upper cowl 3, a screen 4 smoothly connected to upper portions of the upper cowl 3, and a pair of left and right tank covers 5 connected to left and right opposite lower edge portions of the upper cowl 3. A head lamp apparatus 7 is disposed to be surrounded by the upper cowl 3 and the screen 4. Opposite sides of a fuel tank (not shown) are covered with the left and right tank covers 5.

A reference numeral 9 designates front forks. The front forks 9 are axially supported for left and right rotations on a front head portion of a body frame (not shown). A front wheel 10 is supported on lower ends of the front forks 9 and a handle-bar 11 is fixed to upper ends of the front forks 9. A front fender 12 for covering an upper portion of the front wheel 10 is provided to the front.

Next, with reference to FIGS. 3 to 6, the head lamp apparatus 7 comprises a lamp housing 16 having 1a housing body 14 molded by using synthetic resin and a transparent housing lens 15 covering a front surface of the housing body 14, the housing body 14 and the housing lens 15 being joined to each other. The head lamp apparatus 7 is fixed by fastening four fixing arms 17 (see FIG. 4) formed so as to project from a periphery of the housing body 14 to a support stay of the front cowling 2 or the front cowling 2 itself by screws (not shown).

A head lamp bulb 20 for an LO beam is disposed together with a reflector 21 at an upper portion inside the lamp housing 16 and a projector lamp 22 for an HI beam is disposed additionally at a lower portion inside the lamp housing 16. A position bulb 23 is disposed in front of the head lamp bulb 20. As is evident from FIGS. 3 and 5, this means that the position bulb 23 is located at a portion substantially on a center line of a projecting direction of light from the head lamp bulb 20.

The reflector 21 is a synthetic resin molded product applied with a surface treatment such as aluminum vapor deposition, chromium plating, or the like, for example, and is attached to a socket cap 25 together with the head lamp bulb 20. The socket cap 25 is connected to an upper receptor 26 of the housing body 14. The reflector 21 has an aiming screw (not shown) and an optical axis of the LO beam is adjusted by finely adjusting the aiming screw.

On the other hand, the projector lamp 22 is a lamp unit in which light of a halogen bulb 29 built into a lamp body 28 is amplified by a projector lens 30 and radiated forward. A rear portion of the lamp body 28 is connected to a lower receptor 32 of the housing body 14 through a socket cap 31.

Figure 6:
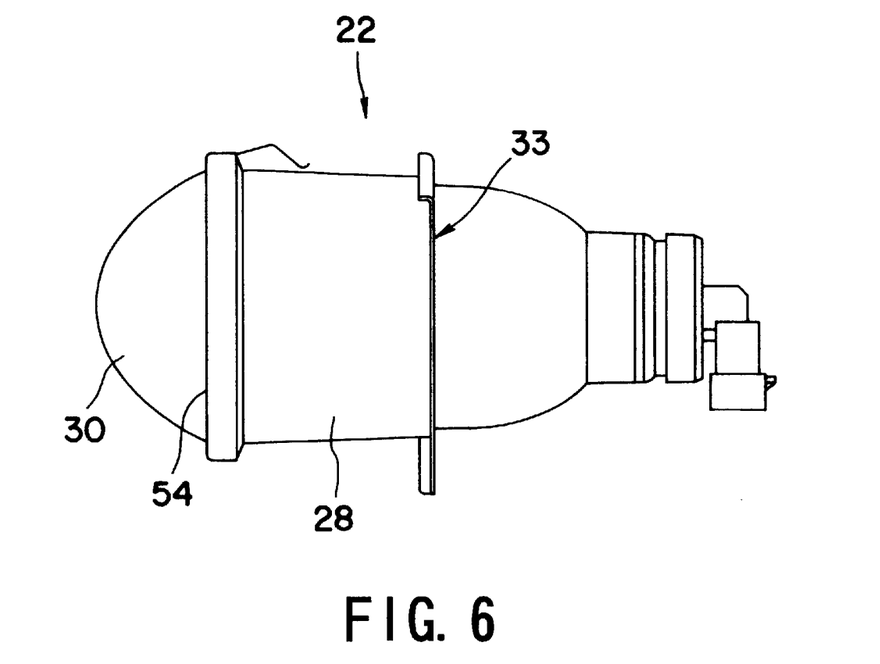
FIG. 6 is a left side view of a projector lamp.
Figure 7:
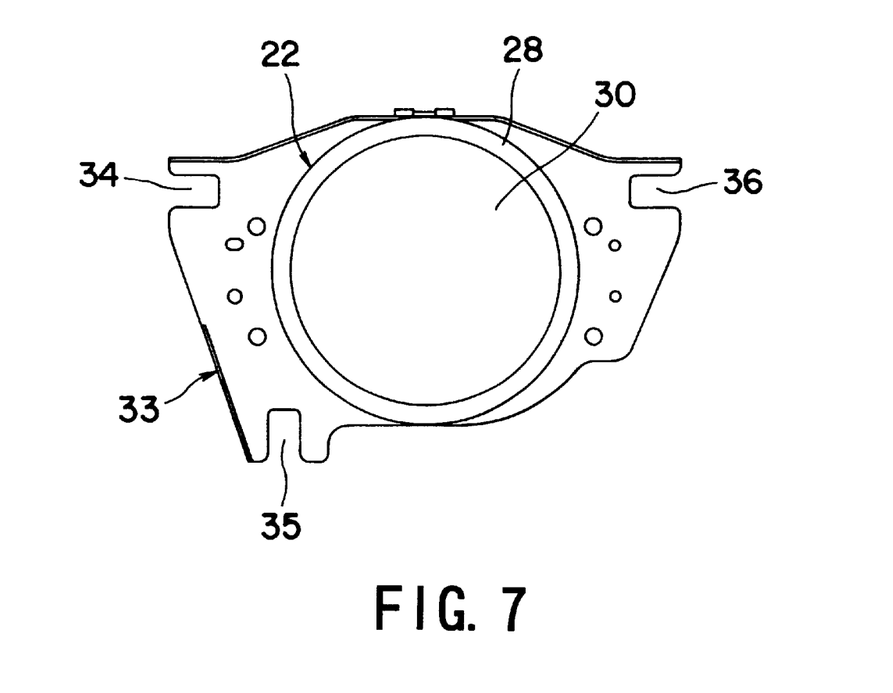
FIG. 7 is a front view of the projector lamp.

As shown in FIGS. 6 and 7, an aiming plate 33 for adjusting an optical axis is fixed to a periphery of the lamp body 28 of the projector lamp 22. A pivot portion 34 (see FIG. 7) positioned at an upper right portion of the aiming plate 33 is fixed to a housing body 14 or the like by a screw (not shown). An optical axis of the HI beam is adjusted by finely adjusting positions in a longitudinal direction of a longitudinal aiming portion 35 positioned below the pivot portion 34 and a transverse aiming portion 36 positioned at the left of the pivot portion 34 by respectively using aiming screws (not shown).

The position bulb 23 is disposed on an upper front side in the lamp housing 16. As shown in enlarged views in FIGS. 8 and 9, a flat attaching surface 40 which is lower by a step is formed at a center portion in a width direction of a vehicle of an upper portion of the housing lens 15, a bulb socket 42 is fitted from above around a cylindrical socket guide 41 formed on the attaching surface 40, and the position bulb 23 is mounted to a tip end of the bulb socket 42.

Figure 8:
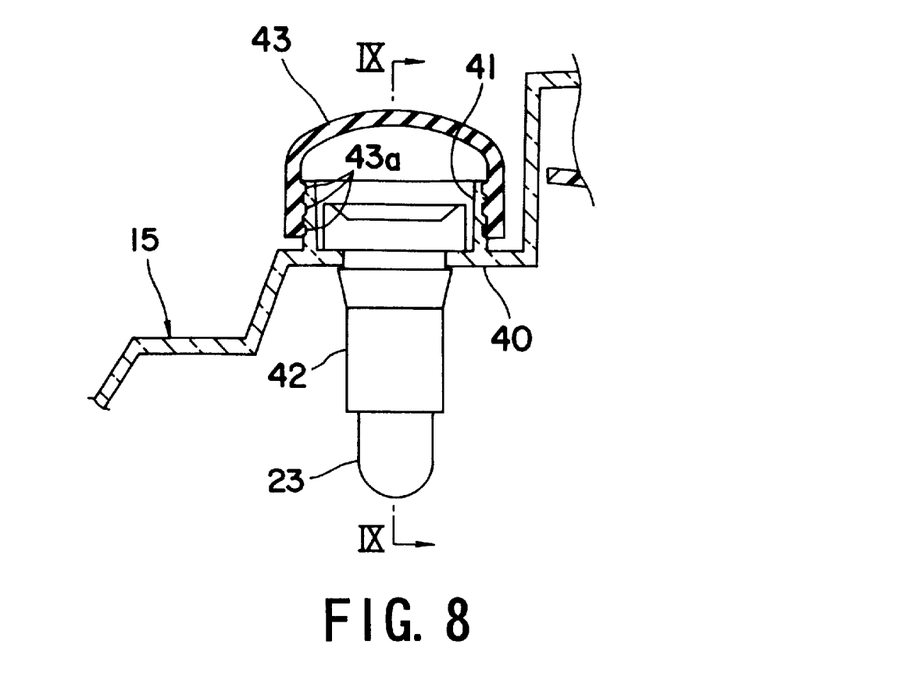
FIG. 8 is an enlarged view of a VIII portion in FIG. 3.
Figure 9:
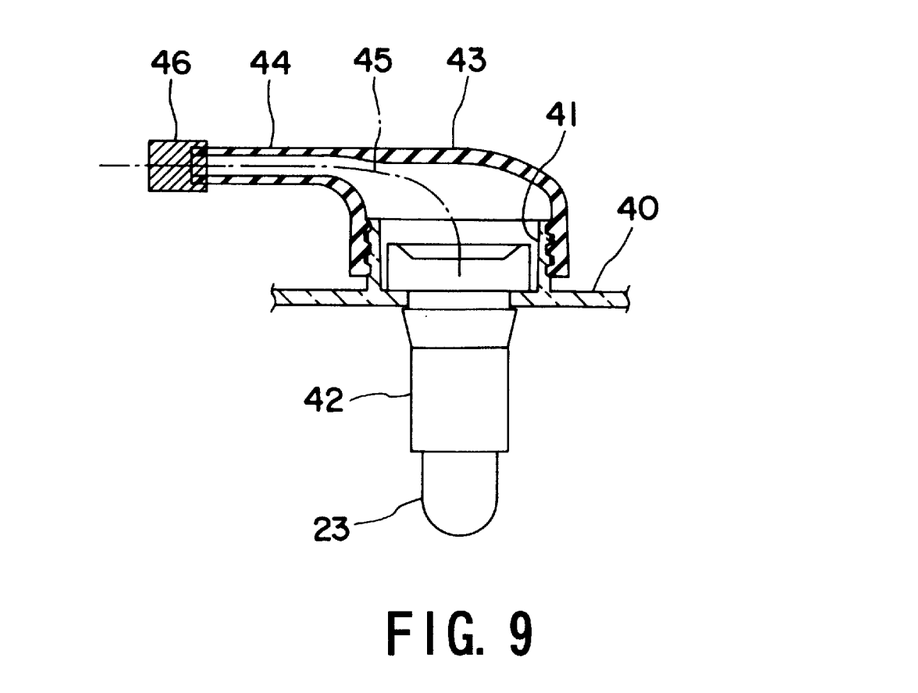
FIG. 9 is a longitudinal sectional view taken along a line IX—IX in FIG. 8.

Therefore, the position bulb 23 is turned upside down and attached to the tip end of the bulb socket 42 extending into the lamp housing 16 from a ceiling portion of the lamp housing 16. A length of the bulb socket 42 is determined such that the position bulb 23 is positioned in front of the head lamp bulb 20.

The socket guide 41 is covered with a flexible socket cover 43 for covering a base portion of the bulb socket 42. The socket cover 43 is formed with a lead wire holder portion 44 extending horizontally and a lead wire 45 inserted through the lead wire holder portion 44 is connected to the bulb socket 42. Because of a taping, a sealing 46, or the like applied to a portion where the lead wire 45 extends out of the lead wire holder portion 44 in addition to the lead wire holder portion 44 extending horizontally, a water-proof property can be improved. Because three annular ribs 43a formed on an inner peripheral surface of the socket cover 43 are pressed against an outer peripheral surface of the socket guide 41, the water-proof property between the socket cover 43 and the socket guide 41 can be improved.

Although the housing lens 15 is not applied with lens cutting and passes light as it is all over the housing lens 15, a lens cut portion 50 is formed only at a portion of the housing lens 15 in front of the position bulb 23.

Figure 3:
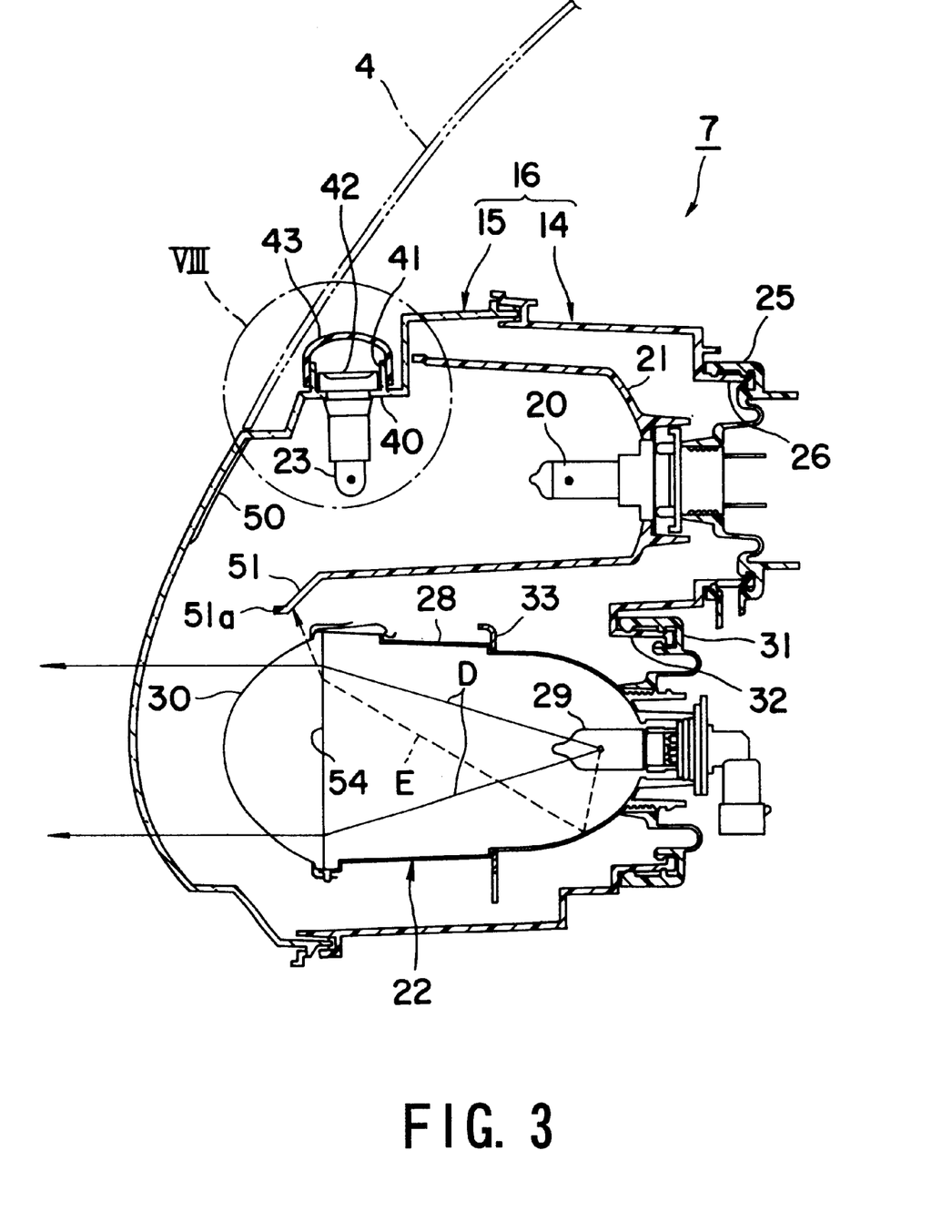
FIG. 3 is a longitudinal sectional view of an embodiment of the head lamp apparatus of the present invention taken along a line III—III in FIG. 2.
Figure 4:
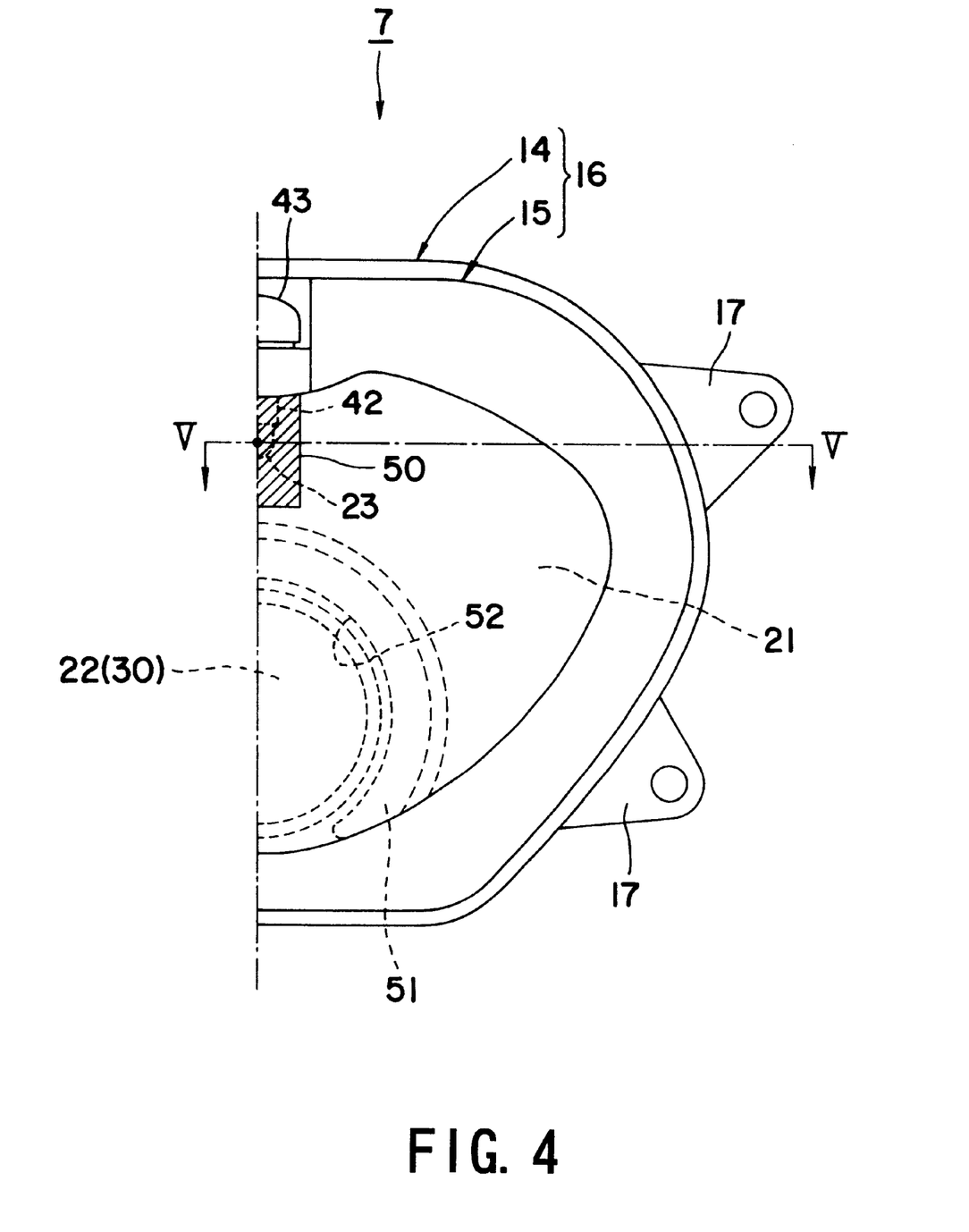
FIG. 4 is a front view of a left half of the head lamp apparatus.

On the other hand, the reflector 21 is formed with an extension portion 51 extending towards the projector lamp 22. The extension portion 51 is defined with an arc-shaped notch 52 such that only the projector lens 30 of the projector lamp 22 is exposed through the notch 52 when the head lamp apparatus is viewed from a front side thereof as shown in FIG. 4. As a result, portions of the projector lamp 22 other than the projector lens 30 are covered with and hidden by the extension portion 51 when the apparatus is viewed from the front side. As shown in FIG. 3, a tip end position 51a of the extension portion 51 is disposed further forward than a joint 54 between the projector lens 30 and the lamp body 28 of the projector lamp 22 when the apparatus is viewed from a side.

Figure 5:
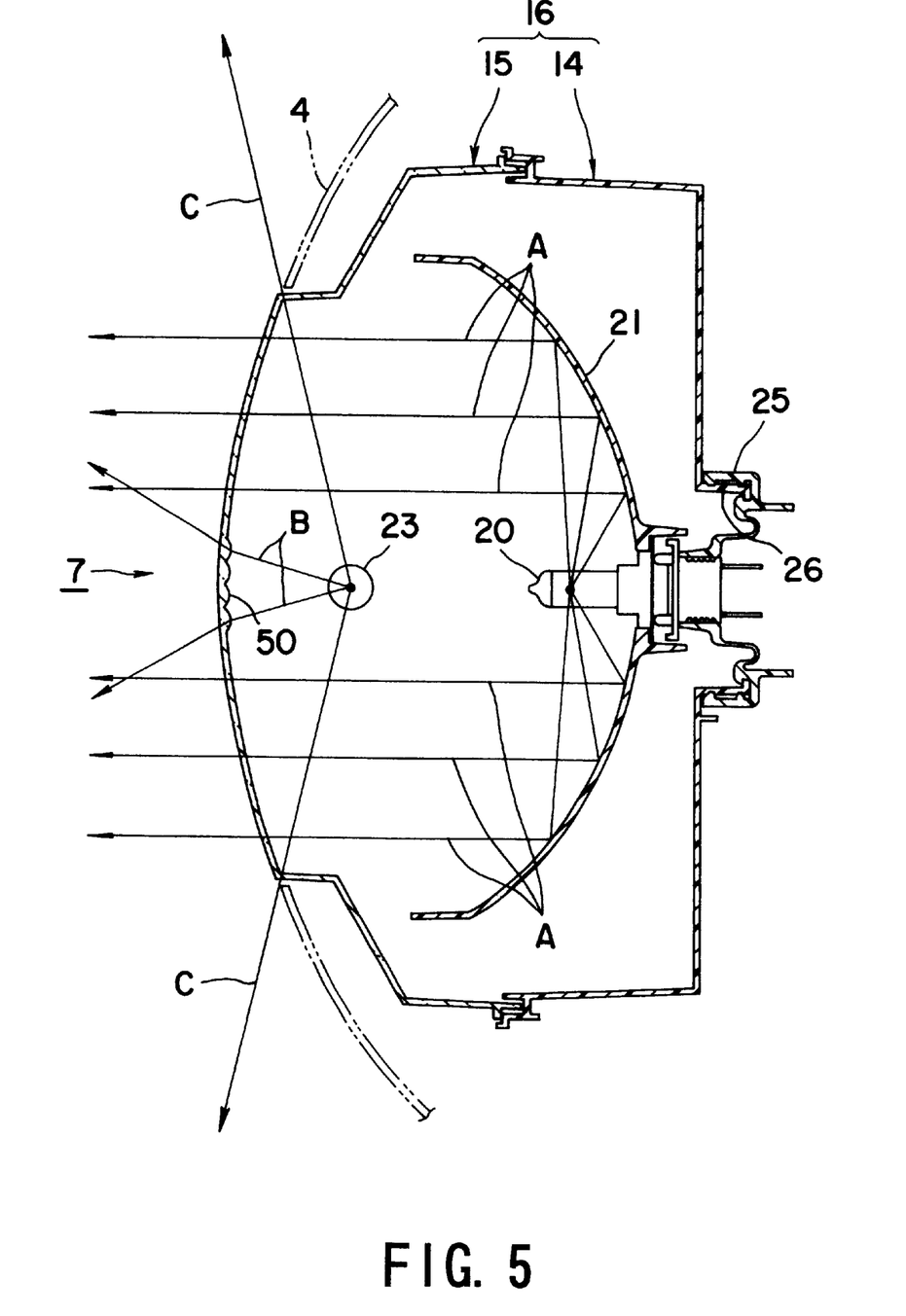
FIG. 5 is a transverse sectional view of the head lamp apparatus taken along a line V—V in FIG. 4.

If the head lamp bulb 20 illuminates in the head lamp apparatus 7 with the above structure, an irradiation light A from the head lamp bulb 20 is reflected by the reflector 21 and is radiated forward as shown in FIG. 5. Because the position bulb 23 disposed in front of the head lamp bulb 20 does not cut off the irradiation light A which is from the head lamp bulb 20 and reflected by the reflector 21, there is no fear that quantity of light of the head lamp bulb 20 is reduced.

On the other hand, the forward irradiation light B from the position bulb 23 is amplified and diffused by the lens cut portion 50 and radiated forward. Because the position bulb 23 is disposed on the upper front side in the lamp housing 16 and is close to the housing lens 15, the irradiation light C from the position bulb 23 radiated diagonally forward or sideways is directly radiated outside with a wide angle without being reflected by the reflector 21. Therefore, satisfactory quantity of light can be obtained and high visibility even from a diagonally forward direction or a sideways direction can be obtained. Moreover, a radiating performance of the position bulb 23 is not affected by a shape of the reflector 21.

As described above, if the position bulb 23 is disposed in front of the head lamp bulb 20 and on the upper front side in the lamp housing 16, the position of the position bulb 23 is not close to one side when the head lamp apparatus 7 is viewed from the front side and the bulb socket 42 for retaining the position bulb 23 is short and is not conspicuous from the outside. As a result, the outer appearance of the head lamp apparatus 7 is dramatically improved.

Moreover, because the bulb socket 42, of the position bulb 23 is short and a drawing direction of the bulb socket 42 is upward, it is easy to attach and detach the bulb socket 42 to and from the lamp housing 16, and thus, the position bulb 23 can be changed easily. Furthermore, because the bulb socket 42 is short, vibration of the vehicle is not amplified to be transmitted to the position bulb 23, and thus, early breaking of a wire of the position bulb 23 can be prevented and a useful life of the position bulb 23 can be increased.

The irradiation light B from the position bulb 23 is efficiently diffused by the lens cut portion 50 formed at the portion of the housing lens 15 in front of the position bulb 23 while the irradiation light A from the head lamp bulb 20 is not directly radiated forward when the head lamp bulb 20 illuminates, thereby improving the anti-glare property of the head lamp apparatus 7.

An irradiation light D from a halogen bulb 29 of the projector lamp 22 is amplified by the projector lens 30 and radiated forward. At this time, because the diffused light beam E radiated from the projector lamp 22 is cut off by the extension portion 51 of the reflector 21, the anti-glare property of the head lamp apparatus 7 can be improved.

By disposing the extension portion 51, only the projector lens 30 of the projector lamp 22 can be seen and the aiming plate 33 or the like provided to the lamp body 28 is hidden when the head lamp apparatus 7 is viewed from the front side. Therefore, the outer appearance of the head lamp apparatus 7 is further improved.

Although an example in which the structure according to the invention is applied to the head lamp apparatus of the motorcycle has been described in the embodiment, the structure of the invention can be widely applied not only to the head lamp apparatus of the motorcycle but also to a head lamp apparatus of an automobile or other vehicles.

What is claimed is:

1. A head lamp apparatus for a vehicle, comprising:

a lamp housing mounted to a front portion of a vehicle body, said lamp housing being provided with a housing body and a transparent housing lens covering a front surface of the housing body;

a head lamp bulb disposed inside the lamp housing and adapted to radiate light;

a reflector for reflecting an irradiation light from the head lamp bulb in a direction forward of the vehicle body; and a position bulb disposed in front of the head lamp bulb and on an upper front side in the lamp housing at a portion substantially on a center line of a projecting direction of light from the head lamp bulb, wherein said head lamp bulb, said reflector and said position bulb are housed in said lamp housing.

2. A head lamp apparatus for a vehicle according to claim 1, wherein said housing lens is provided with a lens cut portion at a position in front of the position bulb.

3. A head lamp apparatus for a vehicle, comprising:

a lamp housing mounted to a front portion of a vehicle body;

a head lamp bulb disposed inside the lamp housing and adapted to radiate light;

a reflector for reflecting irradiation light from the head lamp bulb in a direction forward of the vehicle body;

a position bulb disposed in front of the head lamp bulb inside the lamp housing at a portion substantially on a center line of a projection direction of light from the head lamp bulb; and a projector lamp mounted to the lamp housing adjacent to the reflector and below the head lamp bulb and having a projector lamp body and a projector lamp lens mounted to a front portion of the projector lamp body in the forward direction of the vehicle body, said reflector being formed with an extension extending towards the projector lamp, said extension having a size covering the projector lamp except for the projector lamp lens and having a tip end portion positioned further forward than a joint portion of the projector lens and the lamp body.

4. A head lamp apparatus for a vehicle according to claim 3, wherein said extension has a cutout for preventing the covering of the projector lamp lens.

5. A head lamp apparatus according to claim 3, wherein an aiming means is mounted to the housing body around the projector lamp body so as to adjust an axis of irradiation light.

6. A motorcycle having a head lamp apparatus comprising:

a lamp housing mounted to a front portion of a vehicle body, said lamp housing being provided with a housing body and a transparent housing lens covering a front surface of the housing body;

a head lamp bulb disposed inside the lamp housing and adapted to radiate light;

a reflector for reflecting an irradiation light from the head lamp bulb in a direction forward of the vehicle body; and a position bulb disposed in front of the head lamp bulb and on an upper front side in the lamp housing at a portion substantially on a center line of a projecting direction of light from the head lamp bulb, wherein said head lamp bulb, said reflector and said position bulb are housed in said lamp housing.

7. A motorcycle having a head lamp apparatus comprising:

a lamp housing mounted to a front portion of a vehicle body;

a head lamp bulb disposed inside the lamp housing and adapted to radiate light;

a reflector for reflecting irradiation light from the head lamp bulb in a direction forward of the vehicle body;

a position bulb disposed in front of the head lamp bulb inside the lamp housing at a portion substantially on a center line of a projection direction of light from the head lamp bulb; and a projector lamp mounted to the lamp housing adjacent to the reflector and below the head lamp bulb and having a projector lamp body and a projector lamp lens mounted to a front portion of the projector lamp body in the forward direction of the vehicle body, said reflector being formed with an extension extending towards the projector lamp, said extension having a size covering the projector lamp except for the projector lamp lens and having a tip end portion positioned further forward than a joint portion of the projector lens and the lamp body.

* * * * *